United States Patent [19]

Bice

[11] Patent Number: 5,024,452
[45] Date of Patent: Jun. 18, 1991

[54] REACTOR COOLANT PUMP HAVING THERMALLY STABILIZED HYDROSTATIC SEALING ASSEMBLY

[75] Inventor: Charles D. Bice, Clinton Township, Butler County, Pa.

[73] Assignee: Westinghouse Electric Corp., Pittsburgh, Pa.

[21] Appl. No.: 466,143

[22] Filed: Jan. 16, 1990

[51] Int. Cl.⁵ .............................................. F16J 15/38
[52] U.S. Cl. ...................................... 277/81 R; 277/85; 277/92
[58] Field of Search .................. 277/26, 27, 81 R, 85, 277/86, 87, 92, 94, 96, 96.2

[56] References Cited

U.S. PATENT DOCUMENTS

| | | | |
|---|---|---|---|
| 3,717,353 | 2/1973 | Rayfield | 277/96 |
| 3,751,045 | 8/1973 | Lindeboom | 277/27 |
| 3,770,181 | 11/1973 | Stahl | 277/96 |
| 3,973,780 | 8/1976 | Hornschuch | 277/81 R |
| 4,069,100 | 1/1978 | Cooper | 176/37 |
| 4,071,402 | 1/1978 | Wade | 176/27 |
| 4,275,891 | 6/1981 | Boes | 277/96.1 |
| 4,298,205 | 11/1981 | Ostling | 277/197 |
| 4,341,732 | 7/1982 | Sharbaugh | 376/206 |
| 4,511,149 | 4/1985 | Wiese | 277/87 X |
| 4,693,481 | 9/1987 | Quinn | 277/96.2 |
| 4,700,953 | 10/1987 | Kuusela et al. | 277/87 X |
| 4,706,969 | 11/1987 | Mouri et al. | 277/86 X |
| 4,773,655 | 9/1988 | Lummila et al. | 277/87 X |
| 4,792,146 | 12/1988 | Lebeck et al. | 277/92 X |

FOREIGN PATENT DOCUMENTS 1341427  9/1987  U.S.S.R. ................................ 277/85

OTHER PUBLICATIONS

E. Mayer: "Mechanical Seals", 2nd Edition, pp. 51, 52, 152, and 153, published 1972.

Primary Examiner—William A. Cuchlinski, Jr.
Assistant Examiner—Scott Cummings

[57] ABSTRACT

A pump includes an annular runner and annular seal ring mounted for undergoing relative rotation. The runner includes an annular support member and an annular faceplate member. The faceplate member has a sealing surface and is mounted by a clamp ring member to the annular support member. The support member includes an annular body having outer and inner circumferential edges, an outer raised circumferential rib defined on the body adjacent to its outer circumferential edge at one side of the support member for engagably supporting the faceplate member at an adjacent side thereof, an inner raised circumferential rib defined on the body adjacent to its inner circumferential edge at the one side of the support member for retaining a separate O-ring between the adjacent sides of the faceplate and support members, and an annular recessed cavity defined in the body at the one side of the support member between the outer and inner ribs for substantially spacing the faceplate member from the support member at the adjacent sides thereof to thermally insulate the faceplate member from the support member. Also, a middle raised circumferential rib is defined on the annular support member body between the outer and inner ribs for defining a seat groove with the inner rib for the O-ring.

18 Claims, 6 Drawing Sheets

REACTOR COOLANT PUMP HAVING THERMALLY STABILIZED HYDROSTATIC SEALING ASSEMBLY

CROSS REFERENCE TO RELATED APPLICATIONS

Reference is hereby made to the following applications dealing with related subject matter and assigned to the assignee of the present invention:

1. "Sealing Devices For The Drive Shaft Of A High Pressure Fluid Pump" by N. Bonhomme, assigned U.S. Ser. No. 379,196 and filed May 17, 1982, now U.S. Pat. No. 4,587,076 which issued May 6, 1986.
2. "Nuclear Reactor Coolant Pump Impeller/Shaft Assembly" by L. S. Jenkins, assigned U.S. Ser. No. 761,447 and filed Aug. 1, 1985, now U.S. Pat. No. 4,690,612 which issued Sept. 1, 1987.
3. "Improved Shaft Seal" by K. P. Quinn, assigned U.S. Ser. No. 739,745 and filed May 31, 1985, now U.S. Pat. No. 4,693,481 which issued Sept. 15, 1987.
4. "Reactor Coolant Pump Hydrostatic Sealing Assembly With Improved Hydraulic Balance" by R. F. Guardiani et al., assigned U.S. Ser. No. 063,331 and filed June 17, 1987, now U.S. Pat. No. 4,838,559 which issued June 13, 1989.
5. "Reactor Coolant Pump Sealing Surface With Titanium Nitride Coating" by G. Zottola et al., assigned U.S. Ser. No. 035,832 and filed Apr. 8, 1987, now U.S. Pat. No. 4,871,297 which issued Oct. 3, 1989.
6. "Reactor Coolant Pump Hydrostatic Sealing Assembly With Externally Pressurized Hydraulic Balance Chamber" by C. P. Nyilas et al., assigned U.S. Ser. No. 091,224 and filed Aug. 31, 1987, now U.S. Pat. No. 4,848,774 which issued July 18, 1989.
7. "Reactor Coolant Pump Shaft Seal Utilizing Shape Memory Metal" by D. J. Janocko, assigned U.S. Ser. No. 197,174 and filed May 23, 1988.
8. "Reactor Coolant Pump Auxilary Seal For Reactor Coolant System Vacuum Degasification" by J. D. Fornoff, assigned U.S. Ser. No. 222,649 and filed July 21, 1988.
9. "Reactor Coolant Pump Having Double Dam Seal With Self-Contained Injection Pump Mechanism" by D. J. Janocko, assigned U.S. Ser. No. 231,039 and filed Aug. 12, 1988.
10. "Reactor Coolant Pump Auxiliary Flexible Vacuum Seal For Reactor Coolant System Vacuum Degasification" by C. D. Bice et al., assigned U.S. Ser. No. 294,331 and filed Jan. 6, 1989.
11. "Reactor Coolant Pump Having Improved Dynamic Secondary Seal Assembly" by C. D. Bice et al, assigned U.S. Ser. No. 468,316 and filed Jan. 22, 1990.

BACKGROUND OF THE INVENTION

1. Field of the Invention

The present invention relates generally to shaft seals and, more particularly, is concerned with a thermally stabilized hydrostatic sealing assembly for a reactor coolant pump used in a nuclear power plant.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft. Their combined purpose is to mechanically contain the high positive pressure coolant of the reactor coolant system from leakage along the pump shaft to the containment atmosphere during normal operating condition. Representative examples of pump shaft sealing assemblies known in the prior art are the ones disclosed in U.S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

The lower primary sealing assembly is the main seal of the pump. It is typically a hydrostatic, radially tapered "film-riding", controlled-leakage seal whose primary components are an annular runner which rotates with the pump shaft and a non-rotating annular seal ring which is attached to the housing of the lower seal assembly The annular runner typically includes an annular runner faceplate member mounted by a hydrostatic clamp ring member to an annular runner base or support member which, in turn, is keyed to the pump shaft for rotation therewith The annular seal ring typically includes an annular ring faceplate member mounted by a hydrostatic clamp ring member to an annular ring base or support member which, in turn, is keyed to the seal housing so as to prevent rotational movement of the seal ring relative to the seal housing but allow translatory movement of the seal ring along the pump shaft toward and away from the runner which rotates with the pump shaft Historically, the pump shaft seals constitute the main problem area for the reactor coolant pumps and significantly contribute to the utilization factor in nuclear power plants The seals must be capable of breaking down the high system pressure (about 2500 psi) safely Whereas the tandem arrangement of three seals is used to break down the pressure, the lower main seal absorbs most of the pressure drop (approximately 2250 psi). Being a hydrostatic "film-riding" seal, the lower seal is designed to "lift off" (separate) at low system pressures by a hydrostatic pressure force present in the gap between the stationary seal ring and the rotating runner. A closing or seating force, which must balance the lifting force, is produced by the system pressure acting on the surfaces opposite the film surfaces of the seal ring and runner.

One of the potential problems associated with the lower seal stems from its response to a change of pump inlet water temperature which causes an axial temperature gradient to develop across the rotating runner and stationary seal ring faceplate members. The occurrence of increasing water temperature which creates an axially increasing temperature gradient in the faceplate members is of little concern in view that the flow path between the faceplate members becomes more divergent, resulting in a temporary condition where the film thickness, stiffness and leakrate are greater than normal. Thus, there is no risk of a wiping action taking place between the faceplate members which could produce seal failure. On the other hand, the occurrence of axially decreasing water temperature is of great concern in view that the flow path between the faceplate members becomes more convergent, resulting in a temporary condition where the film thickness, stiffness and leakrate are less than normal. The terminal response to this type of gradient would be a seal ring and runner with nearly parallel seal faces which would wipe one another and possibly fail.

Consequently, a need exists for an approach to hydrostatic sealing assembly construction which will avoid the potential deleterious effects which can arise from development of an axially decreasing water temperature gradient across the seal ring and runner faceplate members.

SUMMARY OF THE INVENTION

The present invention provides a thermally stabilized hydrostatic sealing assembly designed to satisfy the aforementioned needs. Underlying the present invention and comprising a part thereof is the recognition by the inventor herein that thermally insulating between the respective faceplate and support members of the seal ring and runner would decrease the ability of the faceplate members to attain detrimental axial temperature gradients and thus would decrease the sensitivity of the seal to inlet eater temperature changes. The provision of thermal insulative feature is accomplished by undercutting the contact surface of the prior art support members to provide an annular pocket or cavity in areas not necessary to the sealing function. Additionally, an inlet is provided to the annular insulative cavity for permitting water to fill the cavity and provide a substantially static pool of water which acts as an insulating medium. Alternatively, instead of water, a solid insert of insulative material can be provided in the pocket. The lower thermal diffusivity of the insulated pocket would decrease the ability of the faceplate member to attain an axial thermal gradient The undercutting of the support members to provide a simple method of increasing the thermal stability, coincidently provides manufacturing, inspection, and operational improvements as well. The key to these benefits is that 95% of the seating surface between the faceplate members and their respective bases or support members is non-functional as related to proper seal performance; thus, removal of this non-functional surface eliminates a liability with regard to machining, inspecting, dirt inclusion damage, intermolecular attraction effects, and others.

Accordingly, the present invention is directed to a hydrostatic sealing assembly which comprises a pair of sealing parts mountable for undergoing relative rotation wherein at least one of the sealing parts includes an annular support member and an annular faceplate member having a sealing surface and mountable to the support member at respective sides thereof adjacent to one another and spaced from the sealing surface of the faceplate member. The annular support member includes an annular body with outer and inner circumferential edges, outer and inner raised circumferential ribs defined on the annular body adjacent to the respective outer and inner edges, and an annular recessed cavity defined in the body between the outer and inner ribs. The outer rib is defined on the one side of the support member for engagably supporting the faceplate member at the adjacent side thereof when the faceplate member is mounted to the support member. The inner rib is defined on the one side of the support member for retaining a separate sealing element between the respective adjacent sides of the faceplate and support members. The recessed cavity is defined on the one side of the support member between the outer and inner ribs for substantially spacing the faceplate member from the support member at the respective adjacent sides thereof to thermally insulate the faceplate member from the support member.

Further, the separate sealing element of the sealing assembly is an annular flexible 0-ring disposed on the body adjacent to and about the inner rib thereon The 0-ring has a cross-sectional diameter greater than the height of the inner rib so as to project from the one side of the support member, beyond the inner rib, and toward the adjacent side of the faceplate member for sealably engaging the faceplate member at the adjacent side thereof as the outer rib engagably supports the faceplate member at the same adjacent side.

Also, a middle raised circumferential rib is defined on the annular support member body between the outer and inner ribs but closer to the inner rib than the outer rib so as to define a groove in which the annular 0-ring is seated. The inner rib has a cross-sectional height greater than that of the middle rib but less than that of the outer rib.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Figures 1, 2:
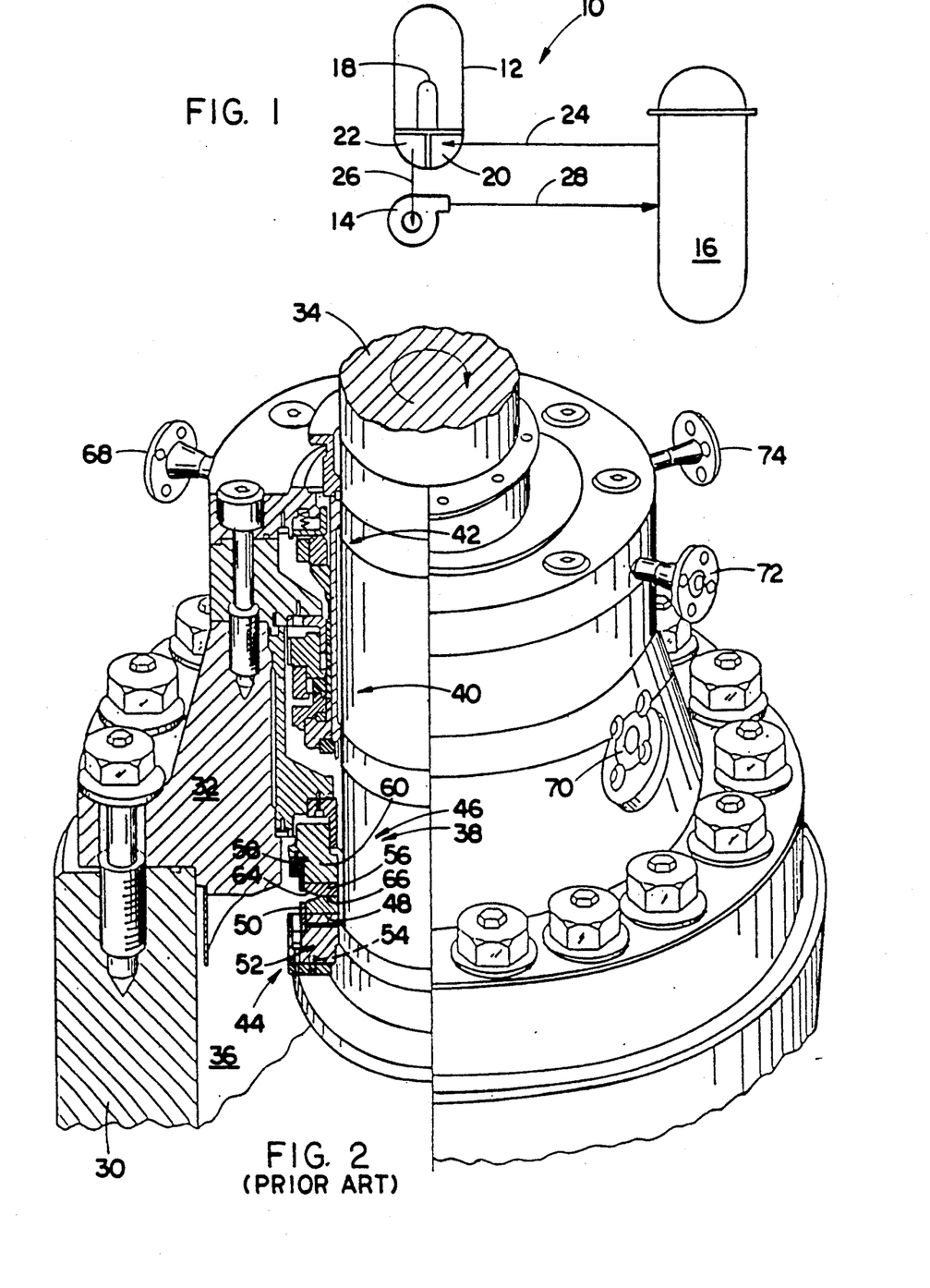
FIG. 1 is a schematic representation of one cooling loop of a conventional nuclear reactor coolant system which includes a steam generator and a reactor coolant pump connected in series in a closed coolant flow circuit with the reactor core.
FIG. 2 is a cutaway perspective view of the shaft seal section of a conventional reactor coolant pump, illustrating in cross-section the seal housing and the lower primary, middle secondary and upper tertiary sealing assemblies which are disposed within the seal housing and surround the pump shaft in this section of the pump.

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2500 psi.

Figure 3:
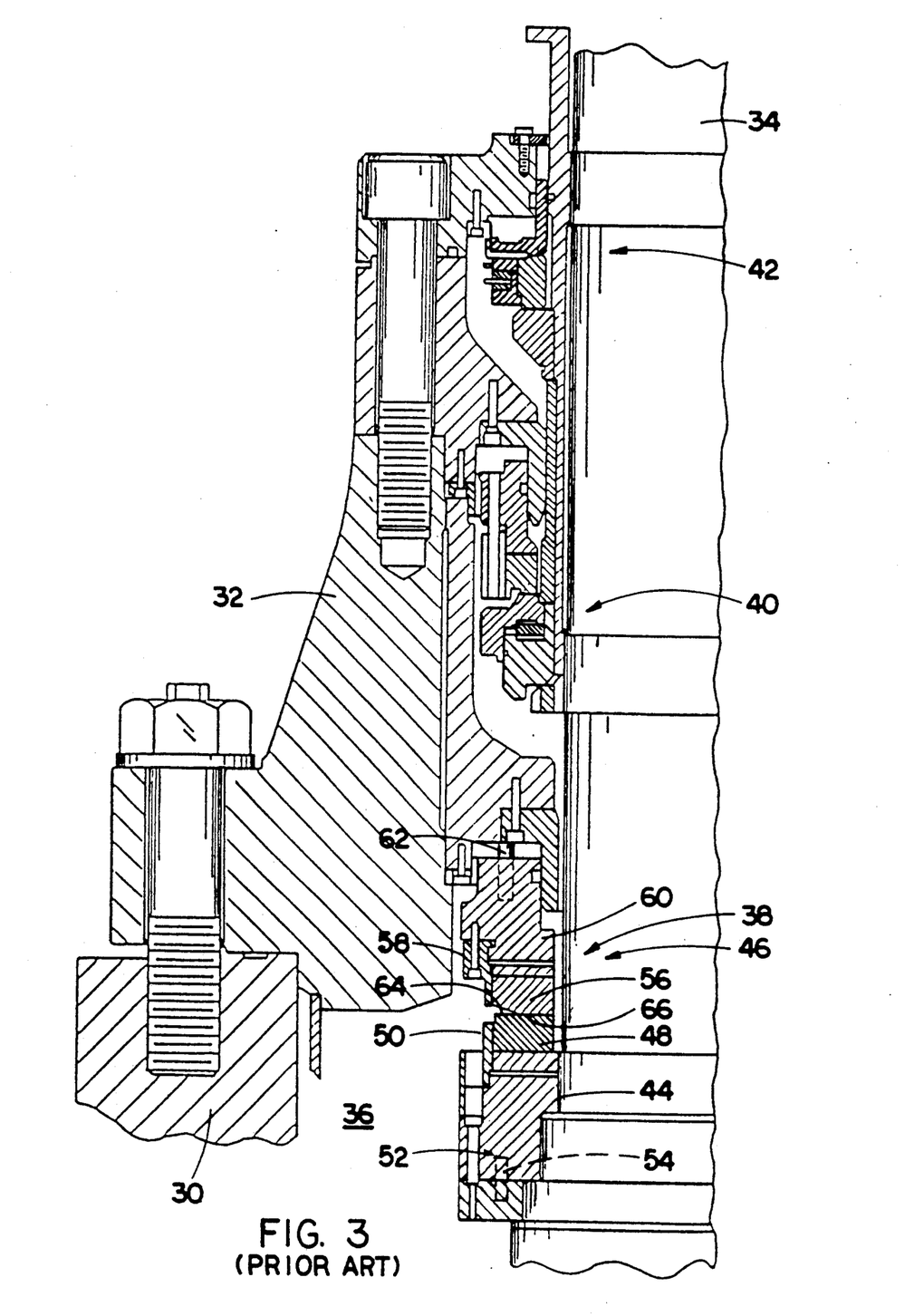
FIG. 3 is an enlarged axial sectional view of the seal housing and sealing assemblies of the reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting or rubbing mechanical type.

Figure 4:
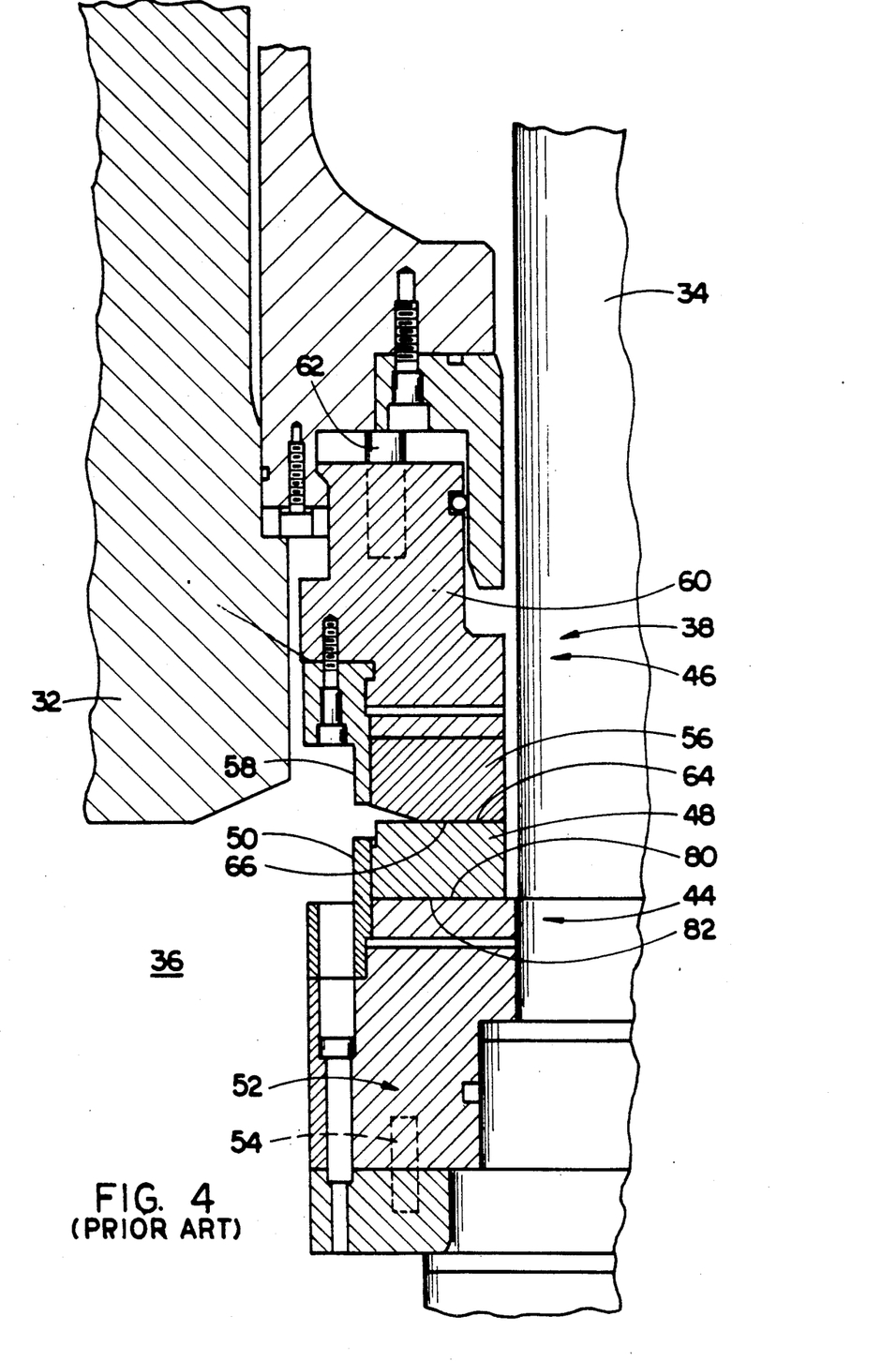
FIG. 4 is an enlarged fragmentary axial sectional view of an upper portion of the sealing housing of the reactor coolant pump of FIG. 3, illustrating the upper tertiary sealing assembly.

As more clearly seen in FIG. 4, the lower hydrostatic primary sealing assembly 38 of the prior art pump 14 generally includes a lower annular runner 44 which is mounted to the pump shaft 34 for rotation therewith and an upper annular seal ring 46 which is stationarily mounted within the seal housing 32. The lower runner 44 includes an upper annular runner faceplate member 48 mounted by a hydrostatic clamp ring member 50 to a lower annular runner base or support member 52 which, in turn, is keyed to the pump shaft 34 by anti-rotation pins 54. The upper seal ring 46 includes an upper annular ring faceplate member 56 mounted by a hydrostatic clamp ring member 58 to an upper annular ring base or support member 60 which, in turn, is keyed to the seal housing 32 by anti-rotation pin 62 so as to prevent rotational movement of the upper seal ring 46 relative to the seal housing 32 but allow translatory movement of the upper seal ring 46 along pump shaft 34 toward and away from the lower runner 44.

Facing (or top and bottom) surfaces 64,66 of the respective runner and upper and lower faceplate members 48,56 are biased toward one another as a result of the coolant pressure load on the pump shaft 34. However, the surfaces 64,66 normally do not frictionally engage one another, since the surface 66 of the upper seal ring faceplate member 56 is tapered at a shallow angle with respect to the substantially flat and horizontal surface 64 on the lower runner faceplate member 48. Such tapering provides a flowing film of coolant fluid between the surfaces 64,66 which, in turn, allows the lower runner 44 and upper seal ring 46 to rotate relative to one another in a "film-riding" mode.

Because the primary sealing assembly 38 normally operates in a film-riding mode, some provision must be made for handling coolant fluid which "leaks off" in the annular space between the seal housing 32 and the shaft 34 rotatably mounted thereto and enters through injection supply port 68 as seen in FIG. 2. Accordingly, the seal housing 32 includes a primary leakoff port 70, whereas leakoff port 72 accommodates coolant fluid leakoff from the secondary sealing assembly 40 and leakoff port 74 accommodates coolant fluid leakoff from the tertiary sealing assembly 42.

Figure 5:
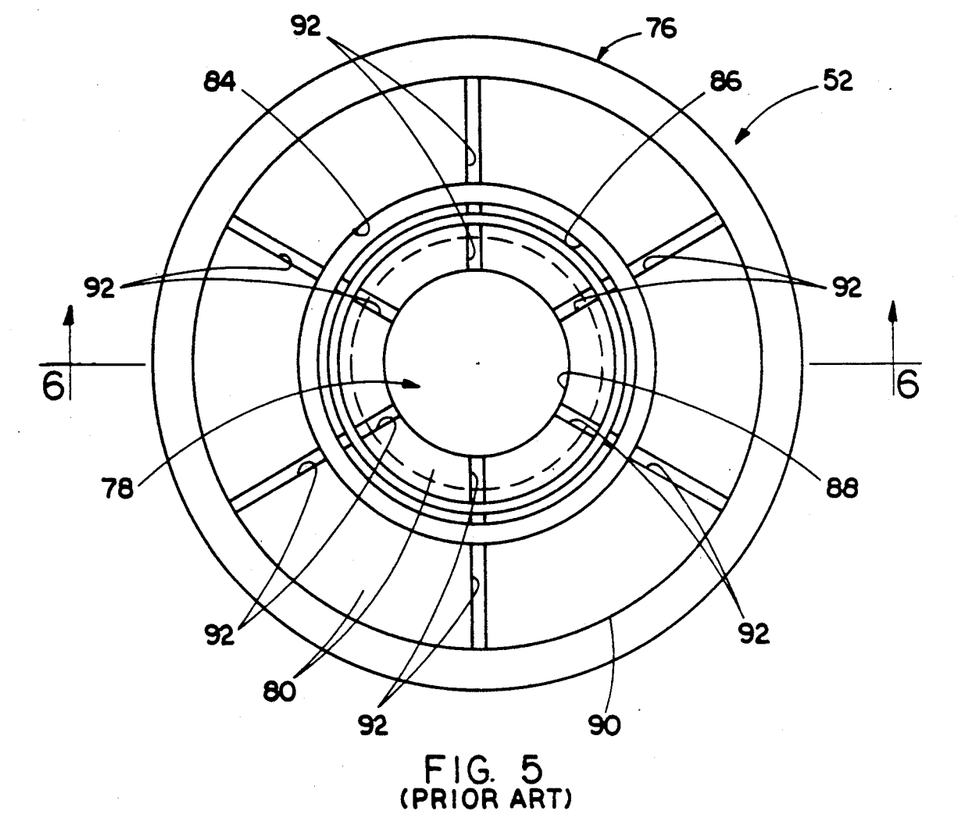
FIG. 5 is an enlarged plan view of an annular support member of a prior art lower primary sealing assembly of the reactor coolant pump of FIG. 3.
Figure 6:
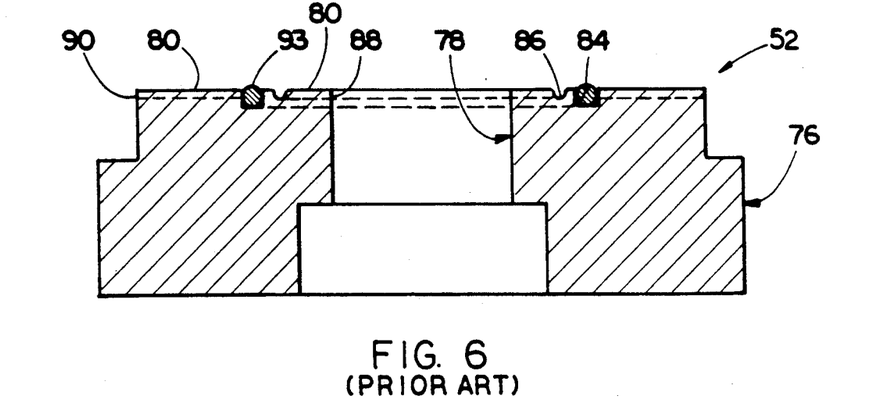
FIG. 6 is an axial sectional view of the annular support member taken along line 6—6 of FIG. 5.

Referring to FIGS. 5 and 6, there is illustrated in greater detail the prior art lower base or support member 52 of the lower annular runner 44 of the lower hydrostatic primary sealing assembly 38 of FIGS. 2-4. The lower support member 52 of &:he lower runner 44 is an annular body 76 having a central bore 78 receiving the pump shaft 34 therethrough. A generally planar top annular surface 80 is defined on the upper side of the body 76 for flush contact with a generally planar bottom annular surface 82 (FIG. 4) on the lower side of the lower runner faceplate member 48. An outer circumferential groove 84 and an inner circumferential pressure communication groove 86 being radially spaced from the outer groove 84 are defined in the top surface 80 of the body 76 nearer to an inner circumferential edge 88 than to an outer circumferential edge 90 of the top surface of the body. The grooves 84,86 are intersected by radial pressure communication grooves 92 which extend between the outer and inner edges 86,88 of the body 76. The outer groove 84 seats a separate sealing element in the form of an 0-ring 93 for providing a seal between the top surface 80 of the lower support member 52 and bottom surface 82 of the lower faceplate member 48.

As explained in the background section supra, the above-described prior art construction of the runner faceplate and support members 48,52 provides a large area of contact at the planar surfaces 80,82 thereof. When pump inlet water temperature decreases, the large area of surface contact permits a decreasing temperature gradient to progress axially from the support member 52 through the faceplate member 48 which can result in thermal distortion of the faceplate member that can cause the facing surfaces 64,66 of the primary sealing assembly 38 to contact and fail.

Thermally Stabilized Hydrostatic Sealing Assembly

Figure 7:
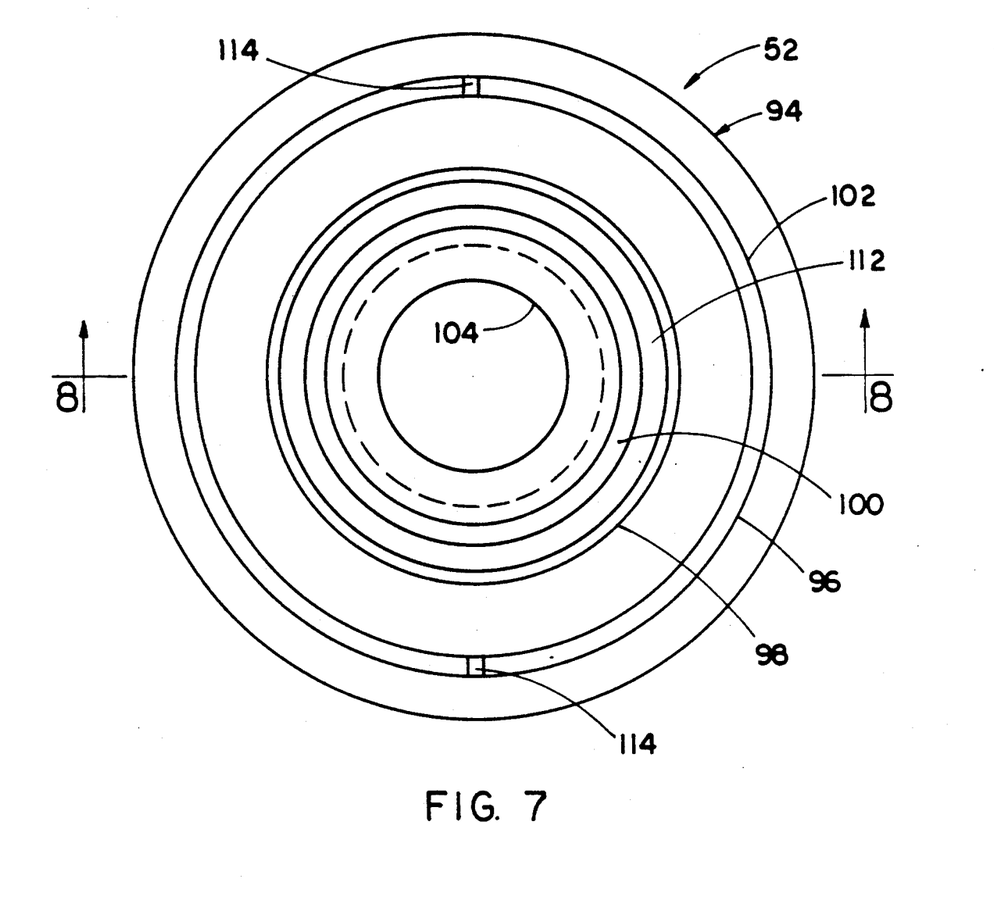
FIG. 7 is a view similar to that of FIG. 5 but of the annular support member of the lower primary sealing assembly after modification in accordance with the present invention.
Figure 8:
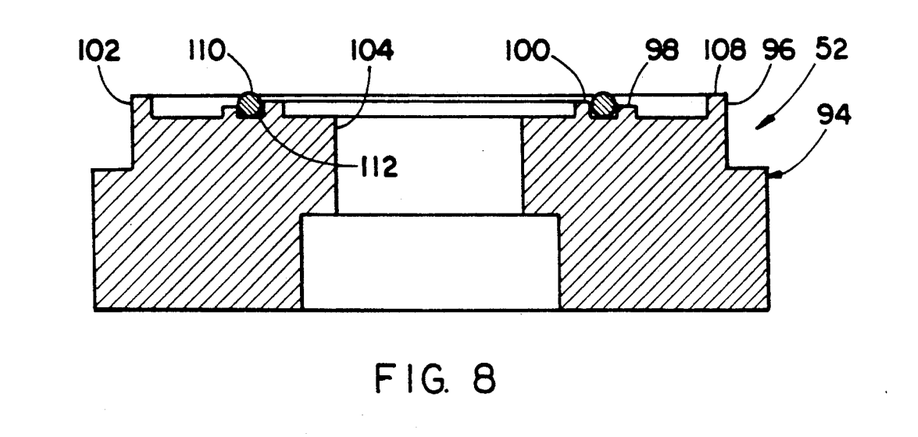
FIG. 8 is an axial sectional view of the modified support member taken along line 8—8 of FIG. 7.
Figure 9:
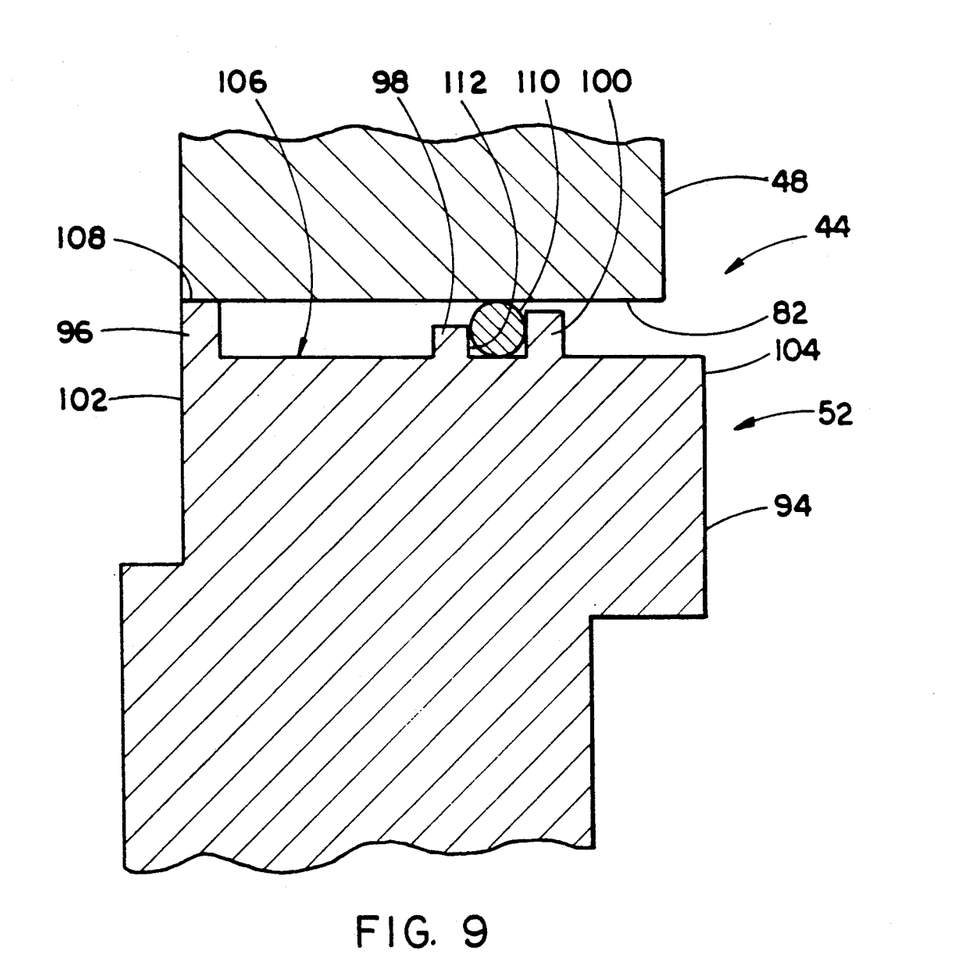
FIG. 9 is an enlarged fragmentary axial sectional view of the lower primary sealing assembly with the modified support member.

Turning now to FIGS. 7-9, there is shown a modified construction of the annular body 94 of the runner support member 52 in accordance with the present invention which avoids the problems arising from the prior art construction described above. Although the modified construction is shown and described in relation to the runner support member 52 only, it should be understood that the modifications can also be applied, if desired, to the seal ring support member 60 of the primary sealing assembly 38. Furthermore, the modified construction can be applied to one of the respective faceplate members 48,56 instead of one of the support members 52,60.

In accordance with the modified construction, the annular body 94 of the lower support member 52 has spaced apart outer, middle and inner raised circumferential ribs 96,98,100 defined on an upper side thereof. The outer rib 96 is located at an outer circumferential edge 102 on the annular body 94, whereas the inner rib 100 is located near to an inner circumferential edge 104 on the body. An annular recessed cavity 106 is defined in the upper side of the body 94 between the outer and inner ribs 96,100. The outer rib 96 has a greater height than both the middle and inner ribs 98,100 such that the lower faceplate member 48 is engagably supported at its bottom surface 82 solely by the generally planar narrow top surface 108 of the outer rib 96 on the upper side of the body 94. The shorter inner rib 100 is provided for retaining the separate annular O-ring 110 between the respective adjacent sides of the faceplate and support members 48,52 during assembling of the primary sealing assembly 38. The O-ring 110 has a cross-sectional diameter greater than the height of the inner rib 100 so as to project from the upper side of the support member 52, beyond the inner rib 100 and beyond the outer rib 96, and toward the adjacent lower side of the faceplate member 48 for sealably engaging the faceplate member.

The middle raised circumferential rib 98 defined on the annular support member body 94 between the outer and inner ribs 96,100, although not essential, is desirable to assist in holding the O-ring 110 in t he desired position during assembling of the primary sealing assembly components and for constraint of the o-ring during possible reverse pressurization. As seen in FIG. 9, the middle rib 98 is spaced much closer to the inner rib 100 than the outer rib 96 so as to define the circumferential groove 112 in which the annular O-ring 110 is seated. The inner rib 100 has a cross-sectional height greater than that of the middle rib 98 but less than that of the outer rib 96.

The recessed cavity 106 so defined on the upper side of the support member body 94 between the outer and inner ribs 96,100 substantially spaces (except for the narrow contact at the top surface 108 of the outer rib 96) the upper faceplate member 48 from the lower support member 52 to thereby thermally insulate the faceplate member from the support member. Additionally, a thermally insulative material such as water (not shown) can be contained in the recessed cavity 106. A suitable alternative insulative material can also be used. The outer rib 96 has at least one and preferably a pair of grooves 114 defined through it in order to provide communication between the housing interior 36 and the recessed cavity 106, permitting inflow of pressurized water into the cavity. The water forms a relatively stagnant non-circulating pool within the cavity 106.

As mentioned previously, the provision of the recessed cavity 106 to increase the thermal stability of the sealing assembly 38 coincidently provides manufacturing, inspection, and operational improvements as well. By reducing the effective contact area by 95%, inspection of the flatness of the seating surfaces on both the faceplate and support members can be carried out with greater validity since the inspection effort can now be concentrated on the remaining 5%. Further, decreasing the contact area by 95% decreases the time required in lapping the contact surfaces and reduces the concern with thermal distortion during performance of the surface lapping The reduction of the effective contact surfaces by 95% significantly reduces the probability of dirt locating therebetween, of accidentally damaging the surfaces, of erratic seal performance due to occurrence of intermolecular attraction, and of deleterious effects from gas trapped between contacting surfaces.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A hydrostatic sealing assembly, comprising:
   (a) a pair of sealing parts mountable for undergoing relative rotation;
   (b) at least one of said sealing parts including an annular support member and an annular faceplate member mountable to said support member, said members having respective one sides adjacent to and spaced from one another, one of said support and faceplate members having a sealing surface at its one side adjacent to and spaced from said one side of said other of said members;
   (c) said other of said support and faceplate members including
      (i) an annular body having radially spaced outer and inner circumferential edges,
      (ii) an outer raised circumferential rib defined on said annular body adjacent to said outer circumferential edge thereof at said one side of said other member for engagably supporting said one member at said adjacent side thereof when said faceplate member is mounted to said support member,
      (iii) an inner raised circumferential rib defined on said annular body adjacent to said inner circumferential edge thereof at said one side of said other member for retaining a separate sealing element between the respective one adjacent sides of said faceplate and support members,
      (iv) an annular flexible sealing element separate from and disposed on said annular body adjacent to and about said inner rib thereon; and
      (v) an annular recessed cavity defined in said annular body at said adjacent side of said other member between said outer and inner ribs for substantially spacing said faceplate member from said support member at said respective one adjacent sides thereof to thermally insulate said faceplate member from said support member;
      (vi) said sealing element having a cross-sectional diameter greater than the height of said inner rib so as to project from said one side of said other member, beyond said inner rib, and toward said adjacent side of said one member for sealably engaging said one member at said adjacent side thereof as said outer rib engagably supports said one member at said adjacent side thereof.

2. The sealing assembly as recited in claim 1, wherein said sealing element is an O-ring.

3. The sealing assembly as recited in claim 1, wherein said one sealing part further includes a middle raised circumferential rib defined on said other member body between said outer and inner ribs.

4. The sealing assembly as recited in claim 3, wherein said middle rib is located closer to said inner rib than to said outer rib so as to define with said inner rib a groove for receiving said separate sealing element therein.

5. The sealing assembly as recited in claim 3, wherein said inner rib has a cross-sectional height greater than that of said middle rib but less than that of said outer rib.

6. The sealing assembly as recited in claim 1, further comprising:
   a thermally insulative material contained in said recessed cavity.

7. The sealing assembly as recited in claim 6, wherein said insulative material is water.

8. The sealing assembly as recited in claim 6, wherein said outer rib has at least one groove defined therethrough for providing communication between the exterior of said rib and said cavity.

9. In a pump having a stationary housing with pressurized fluid therein and a shaft with a rotational axis, a sealing assembly disposed in said housing and sealably mounting said shaft relative to said housing, said sealing assembly comprising:
   (a) an annular runner circumscribing and mounted around said shaft for rotation therewith; and
   (b) an annular seal ring circumscribing and mounted within said housing in non-rotational relationship thereto but for translatory movement along said shaft and said housing toward and away from said runner;
   (c) said runner and seal ring having respective annular surfaces facing one another and between which pressurized fluid within said housing creates a flowing film of fluid which prevents said facing annular surfaces of said respective runner and seal ring from coming into contact with one another;
   (d) at least one of said runner and seal ring including
      (i) an annular faceplate member having first and second axially-spaced opposite sides with said facing annular surface of said one of said runner and seal ring defined at said first side,
      (ii) an annular support member having first and second axially-spaced opposite sides with said first side thereof facing said second side of said faceplate member, and
      (iii) means for mounting said faceplate member at said second side thereof to said support member at said first side thereof;
   (e) said annular support member including
      (i) an annular body having radially spaced outer and inner circumferential edges,
      (ii) an outer raised circumferential rib defined on said annular body adjacent to said outer circumferential edge thereof at said first side of said support member for engagably supporting said annular faceplate member at said second side thereof,
      (iii) an inner raised circumferential rib defined on said annular body adjacent to said inner circumferential edge thereof at said first side of said support member,
      (iv) an annular flexible sealing element disposed on said annular body adjacent to and about said inner rib, said sealing element projecting beyond said inner rib toward said second side of said faceplate member for sealably engaging said faceplate member at said second side thereof as said outer rib engagably supports said faceplate member as said second side thereon; and
      (v) an annular recessed cavity defined in said annular body at said adjacent side of said other member between said outer and inner ribs on said body for substantially spacing said second side of said faceplate member from said first side of said support member to substantially thermally insulate said faceplate member from said support member;
      (vi) said sealing element having a cross-sectional diameter greater than the height of said inner rib so as to project from said first side of said support member, beyond said inner and outer ribs, and toward said adjacent second side of said faceplate member for sealably engaging said faceplate member at said adjacent side thereof as said outer rib engagably supports said faceplate member at said second side thereof.

10. The sealing assembly as recited in claim 3, wherein said sealing element is an O-ring.

11. The sealing assembly as recited in claim 9, wherein said annular support member further includes a middle raised circumferential rib is defined on said body between the outer and inner ribs.

12. The sealing assembly as recited in claim 11, wherein said middle rib is located closer to said inner rib than to said outer rib so as to define a groove with said inner rib for receiving said separate sealing element therein.

13. The sealing assembly as recited in claim 11, wherein said inner rib has a cross-sectional height greater than that of said middle rib but less than that of said outer rib.

14. The sealing assembly as recited in claim 3, further comprising:
a thermally insulative material contained in said recessed cavity.

15. The sealing assembly as recited in claim 14, wherein said insulative material is water.

16. The sealing assembly as recited in claim 9, wherein said outer rib has at least one groove defined therethrough for providing communication between the exterior of said rib and said cavity.

17. A hydrostatic sealing assembly, comprising:
(a) a pair of sealing parts mountable for undergoing relative rotation;
(b) at least one of said sealing parts including an annular support member and an annular faceplate member mountable to said support member, said members having respective one sides adjacent to and spaced from one another, one of said support and faceplate members having a sealing surface at its one side adjacent to and spaced from said one side of said other of said members;
(c) said other of said support and faceplate members including
 (i) an annular body having radially spaced outer and inner circumferential edges,
 (ii) an outer raised circumferential rib defined on said annular body adjacent to said outer circumferential edge thereof at said one side of said other member for engagably supporting said one member at said adjacent side thereof when said faceplate member is mounted to said support member,
 (iii) an inner raised circumferential rib defined on said annular body adjacent to said inner circumferential edge thereof at said one side of said other member for retaining a separate sealing element between the respective one adjacent sides of said faceplate and support members,
 (iv) an annular recessed cavity defined in said annular body at said adjacent side of said other member between said outer and inner ribs for substantially spacing said faceplate member from said support member at said respective one adjacent sides thereof to thermally insulate said faceplate member from said support member, and
 (v) a middle raised circumferential rib defined on said other member body between said outer and inner ribs, said middle rib being located closer to said inner rib than to said outer rib so as to define with said inner rib a groove for receiving said separate sealing element therein, said inner rib having a cross-sectional height greater than that of said middle rib but less than that of said outer rib.

18. In a pump having a stationary housing with pressurized fluid therein and a shaft with a rotational axis, a sealing assembly disposed in said housing and sealably mounting said shaft relative to said housing, said sealing assembly comprising:
(a) an annular runner circumscribing and mounted around said shaft for rotation therewith; and
(b) an annular seal ring circumscribing and mounted within said housing in non-rotational relationship thereto but for translatory movement along said shaft and said housing toward and away from said runner;
(c) said runner and seal ring having respective annular surfaces facing one another and between which pressurized fluid within said housing creates a flowing film of fluid which prevents said facing annular surfaces of said respective runner and seal ring from coming into contact with one another;
(d) at least one of said runner and seal ring including
 (i) an annular faceplate member having first and second axially-spaced opposite sides with said facing annular surface of said one of said runner and seal ring defined at said first side,
 (ii) an annular support member having first and second axially-spaced opposite sides with said first side thereof facing said second side of said faceplate member, and
 (iii) means for mounting said faceplate member at said second side thereof to said support member at said first side thereof;
(e) said annular support member including
 (i) an annular body having radially spaced outer and inner circumferential edges,
 (ii) an outer raised circumferential rib defined on said annular body adjacent to said outer circumferential edge thereof at said first side of said support member for engagably supporting said annular faceplate member at said second side thereof,
 (iii) an inner raised circumferential rib defined on said annular body adjacent to said inner circumferential edge thereof at said first side of said support member,
 (iv) an annular flexible sealing element disposed on said annular body adjacent to and about said inner rib, said sealing element projecting beyond said inner rib toward said second side of said faceplate member for sealably engaging said faceplate member at said second side thereof as said outer rib engagably supports said faceplate member as said second side thereof,
 (v) an annular recessed cavity defined in said annular body at said first side of said support member between said outer and inner ribs on said body for substantially spacing said second side of said faceplate member from said first side of said support member to substantially thermally insulate said faceplate member from said support member, and
 (vi) a middle raised circumferential rib defined on said body between said outer and inner ribs, said middle rib being located closer to said inner rib than to said outer rib so as to define a groove with said inner rib for receiving said sealing element therein, said inner rib having a cross-sectional height greater than that of said middle rib but less than that of said outer rib.

* * * * *